United States Patent [19]

Ikenaga et al.

[11] Patent Number: 5,636,353
[45] Date of Patent: Jun. 3, 1997

[54] SUPERSCALAR PROCESSOR WITH DIRECT RESULT BYPASS BETWEEN EXECUTION UNITS HAVING COMPARATORS IN EXECUTION UNITS FOR COMPARING OPERAND AND RESULT ADDRESSES AND ACTIVATING RESULTS BYPASSING

[75] Inventors: Chikako Ikenaga; Hideki Ando, both of Hyogo-ken, Japan

[73] Assignee: Mitsubishi Denki Kabushiki Kaisha, Tokyo, Japan

[21] Appl. No.: 225,265

[22] Filed: Apr. 7, 1994

Related U.S. Application Data

[63] Continuation of Ser. No. 828,277, Jan. 30, 1992, abandoned.

[30] Foreign Application Priority Data

Jun. 17, 1991 [JP] Japan .................................. 3-144560

[51] Int. Cl.$^6$ ........................................................ G06F 9/38
[52] U.S. Cl. ........................................................ 395/394
[58] Field of Search .................................. 395/375, 800, 395/394

[56] References Cited

U.S. PATENT DOCUMENTS

| | | | |
|---|---|---|---|
| 4,594,655 | 6/1986 | Hao et al. | 395/775 |
| 4,916,652 | 4/1990 | Schwarz et al. | 395/375 |
| 5,043,868 | 8/1991 | Kitamura et al. | 395/775 |
| 5,051,940 | 9/1991 | Vassiliadis et al. | 364/736 |
| 5,197,135 | 3/1993 | Eickemeyer et al. | 395/375 |
| 5,214,763 | 5/1993 | Blaner et al. | 395/375 |
| 5,333,281 | 7/1994 | Nishikawa et al. | 395/375 |

OTHER PUBLICATIONS

"Instruction Issue Logic for High Performance, Interruptible, Multiple Functional Unit, Pipelined Computers", by Gurindar S. Sohi, IEEE Transactions on Computers, vol. 39, No. 3, Mar. 1990, pp. 349–359.

"Computer Architecture and Parallel Processing", K. Hwang et al., McGraw–Hill Book Company 1984, pp. 200–203.

Horowitz et al., "MIPS–X; A 20–MIPS Peak, 32–bit Micropressor with On–Chip Cache", IEEE Journal of Solid–State Circuits, vol. sc–22, No. 5, Oct. 1987, pp. 790–799.

Groves et al., "An IBM Second Generation RISC Processor Architecture", IEEE 1990, pp. 166–172.

McGeady, "The 1960CA SuperScalar Implementation of the 80960 Architecture", IEEE 1990, pp. 232–240.

Gurindar S. Sohi, *Instruction Issue Logic for High–Performance, Interruptible, Multiple Functional Unit, Pipelined Computers*, IEEE Transactions on Computers, vol. 39, No. 3, Mar. 1990.

*Primary Examiner*—Richard L. Ellis
*Attorney, Agent, or Firm*—Lowe, Price, LeBlanc & Becker

[57] ABSTRACT

The disclosed is an improved superscalar processor for reducing the time required for execution of an instruction. The superscalar processor includes an instruction fetching stage, an instruction decoding stage, and function units each having a pipeline structure. A function unit includes an execution stage, a memory access stage, and a write back stage. Function units are connected through a newly provided bypass line. Data obtained by preceding execution in the other function unit (the other pipeline) is applied through the bypass line to a function unit (pipeline) for executing a later instruction. Executed data is transmitted between pipelines without through a register file, so that it becomes unnecessary for the pipeline requesting the executed data to wait for termination of execution of the other pipeline. As a result, time required for execution of an instruction is reduced.

5 Claims, 7 Drawing Sheets

SUPERSCALAR PROCESSOR WITH DIRECT RESULT BYPASS BETWEEN EXECUTION UNITS HAVING COMPARATORS IN EXECUTION UNITS FOR COMPARING OPERAND AND RESULT ADDRESSES AND ACTIVATING RESULTS BYPASSING

This application is a continuation of application Ser. No. 07/828,277 filed Jan. 30, 1992 now abandoned.

BACKGROUND OF THE INVENTION

1. Field of the Invention

The present invention relates generally to superscalar processors and, more particularly, to a superscalar processor capable of directly transferring data used in a plurality of instructions executed in parallel between pipelines.

2. Description of the Background Art

"A superscalar" is known as one of the architectures for increasing the processing speed of a microprocessor. Instructions which can be executed simultaneously are detected out of given plurality of instructions, and the detected instructions are processed simultaneously or in parallel by a plurality of pipelines in a microprocessor using a superscalar.

FIG. 7 is a block diagram of a superscalar processor illustrating the background of the present invention. Referring to FIG. 7, a superscalar processor 20 includes an instruction fetching stage 2 for fetching a plurality of instructions stored in an instruction memory 1, instruction decoding stage 3 for decoding the instructions fetched in instruction fetching stage 2, function units 14 to 17 each having a pipeline structure, and a register file 9 for temporarily holding data used for executing the instructions. Functional units 14 to 17 can access an external data memory 8 through a data bus 11. Register file 9 is implemented with a RAM and is accessed from function units 14 to 17.

Instruction fetching stage 2 includes a program counter (not shown) and gives an address signal generated from the program counter to instruction memory 1. Designated plurality of instructions designated by the given address signal are fetched and held in instruction fetching stage 2.

Instruction decoding stage 3 receives the plurality of instructions from instruction fetching stage 2 and decodes them. Simultaneously executable instructions are detected out of the given plurality of instructions by decoding the instructions. In addition, instruction decoding stage 3 relays data between function units 14 to 17 and register file 9. Specifically, instruction decoding stage 3 reads data to be used by function units 14 to 17 for executing the given instructions from register file 9 and gives the read data to function units 14 to 17.

Each of function units 14 to 17 has a pipeline structure. Specifically, superscalar processor 20 has four pipelines implemented with four function units 14 to 17.

The four function units 14 to 17 perform predetermined arithmetic operations as described in the following, for example. Function units 14 and 15 perform integer arithmetic operations. Function unit 16 carries out loading and storing of data into data memory 8. Function unit 17 performs floating-point arithmetic operations. Each of function units 14 and 15 includes an execution stage (EXC) and a write back stage (WB) to register file 9. Function unit 16 includes an address processing stage (ADR), a memory accessing stage (MEM), and a write back stage (WB).

Function unit 17 includes three execution stages (EX1, EX2, EX3) and a write back stage (WB). Generally, the execution stages perform arithmetic operations and an address calculation, and, on the other hand, the memory access stage performs reading/writing from/into data memory 8.

Superscalar processor 20 operates in response to externally applied two-phase non-overlap clock signals $\phi 1$ and $\phi 2$. Specifically, instruction fetching stage 2, instruction decoding stage 3, and various stages in function units 14 to 17 are operated in response to clock signals $\phi 1$ and $\phi 2$ under the control of pipelines. An example of two-phase non-overlap clock signals is illustrated in FIG. 6.

In operation, instruction decoding stage 3 detects simultaneously executable instructions out of given plurality of instructions and gives the detected instructions to function units 14 to 17 (according to circumstances, to some of function units 14 to 17). Function units 14 to 17 have pipeline structure, so that they can execute the given instructions simultaneously or in parallel.

Now, it is assumed that a superscalar processor has three function units (pipelines), and each function unit has an execution stage (EXC), a memory access stage (MEM), and a write back stage (WB). An example of progress of pipeline processing in this case is illustrated in FIG. 8A. Referring to FIG. 8A, it is assumed that three pipelines PL1, L2, and PL3 execute instructions 1, 2, and 3, respectively. Processing in instruction fetching stage 2 is performed in a period T1, and processing in instruction decoding stage 3 is performed in a period T2 in pipeline PL1. Processing in the execution stage, the memory access stage, and the write back stage is executed in periods T3, T4, and T5, respectively. On the other hand, in pipeline PL2, processing in instruction fetching stage 2 is started in period T2. The stages (ID, EXC, MEM, WB) are performed in periods T3 to T6, respectively, as in pipeline 1. In pipeline PL3, after processing in instruction fetching stage 2 is started in period T3, processing in respective stages is performed in periods T4 to T7. As seen from FIG. 8A, each of pipelines PL1 to PL3 executes corresponding one of the given instructions 1 to 3, so that it is understood that respective stages are made to proceed simultaneously and in parallel. However, a problem arises from the view point of time required for processing in the following case.

Referring to FIG. 8B, it is assumed that two instructions 11 and 12 are given, and they are processed by pipelines PL1 and PL2. In addition, it is assumed that the data of a result obtained by executing instruction 11 is used in processing of instruction 12. In other words, it is assumed that instruction 12 which executes its own processing using the data obtained by executing instruction 11 is given.

Conventionally, instruction 11 is executed and terminated first in such a case. Specifically, in pipeline PL1, instruction fetching stage 2 is executed in period T1, and instruction decoding stage 3 is executed in period T2. The execution stage, the memory access stage, and the write back stage are executed in periods T3, T4, and T5, respectively. Data obtained by executing instruction 11 is once stored in register file 9 illustrated in FIG. 7 according to execution of the write back stage. On the other hand, in pipeline PL2, instruction fetching stage 2 is executed in period T2, and instruction decoding stage 3 is executed in period T3. However, execution of instruction 12 is stopped in periods T4 and T5. The reason for this is that instruction 12 uses data obtained by executing instruction 11 as described above, so that it should wait for termination of execution of instruction 11. Accordingly, processing in pipeline PL2 is stopped until the write back stage in pipeline PL1 is terminated in period T5. In other words, pipeline PL2 is brought to a standby state (pipeline interlock) in periods T4 and T5.

After period T5, the data obtained by executing instruction 11 is stored in register file 9. Therefore, execution of instruction 12 is restarted in pipeline PL2 in period T6. Specifically, after instruction decoding stage 3 is executed in period T6, the execution stage, the memory access stage, and the write back stage are executed in periods T7 to T9, respectively.

As described above, after the data obtained by executing instruction 11 is once written in register file 9, register file 9 is accessed in processing of another instruction 12. In other words, the data obtained by executing processing in a pipeline PL1 is given to another pipeline PL2 through register file 9. However, as illustrated in FIG. 8B, although the data obtained by executing instruction 11 has been already obtained by processing in the execution stage in period T3, transmission of data between two pipelines PL1 and PL2 is performed through register file 9, so that pipeline PL2 must wait for termination of execution of the write back stage in pipeline PL1. As a result, a long time was required for completing execution of the instruction. In other words, the processing speed of a superscalar processor was reduced.

SUMMARY OF THE INVENTION

An object of the present invention is to reduce the time required for executing an instruction using the data obtained by executing another instruction in a superscalar processor capable of executing two or more instructions simultaneously or in parallel.

Another object of the present invention is to prevent pipeline interlock in a superscalar processor capable of executing two or more instructions simultaneously or in parallel.

To be brief, a superscalar processor according to the present invention executes a first plurality of instructions given earlier and a second plurality of instructions given later under pipeline control, using data stored in a data storage circuit. Each instruction includes a source address indicating an address in the data storage circuit wherein data to be used for executing the instruction is stored and a destination address indicating an address in a data storage circuit wherein the executed data should be stored. The superscalar processor includes a simultaneously executable instruction detecting circuit for detecting simultaneously executable instructions out of the given first or second plurality of instructions and a plurality of pipeline processing executing circuits for executing respective instructions detected by the simultaneously executable instruction. detecting circuit simultaneously and in parallel under pipeline control. Each of the pipeline processing executing circuits includes an earlier instruction executing circuit and a later instruction executing circuit for executing sequentially the given instructions under pipeline control. The later instruction executing circuit provided in at least one of the plurality of pipeline processing executing circuits includes an address coincidence detecting circuit for detecting coincidence between the source address included in a given instruction and the destination address included in the instruction executed in the earlier instruction executing circuit in another pipeline processing executing circuit, and a direct application circuit responsive to the address coincidence detecting circuit for applying the data executed in the earlier instruction executing circuit in another pipeline processing executing circuit directly to the later instruction executing circuit provided in at least one pipeline processing executing circuit.

In operation, in response to the address coincidence detecting circuit, the direct application circuit applies the data executed in the earlier instruction executing circuit in another pipeline processing executing circuit directly to the later instruction executing circuit provided in at least one pipeline processing executing circuit. Specifically, the later instruction executing circuit in the at least one pipeline processing executing circuit directly receives the data executed in the earlier instruction executing circuit in another pipeline processing executing circuit without going through the data storage circuit, so that it is possible to complete the instruction in a short time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
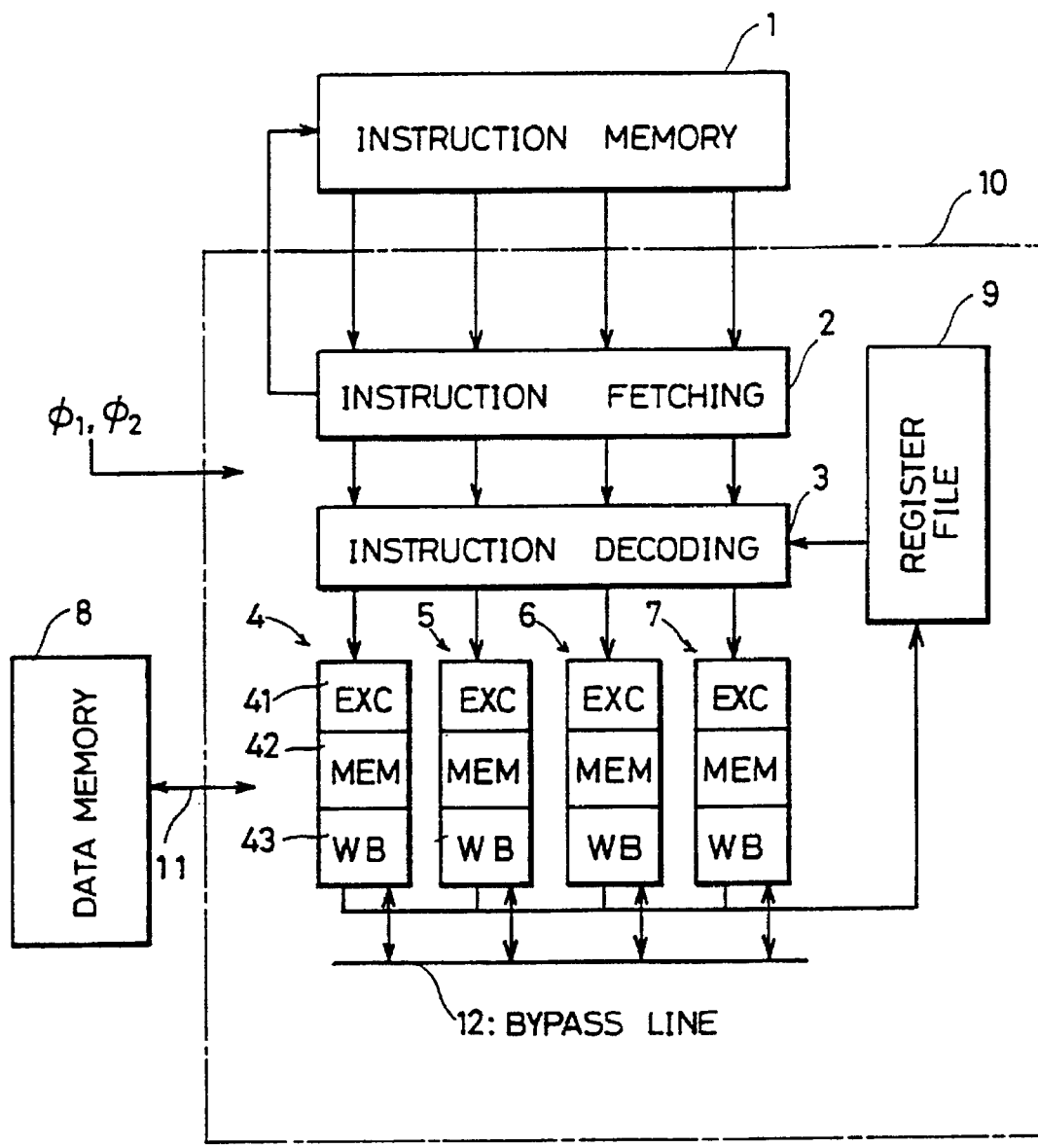
FIG. 1 is a block diagram of a superscalar processor illustrating an embodiment of the present invention.
Figure 7:
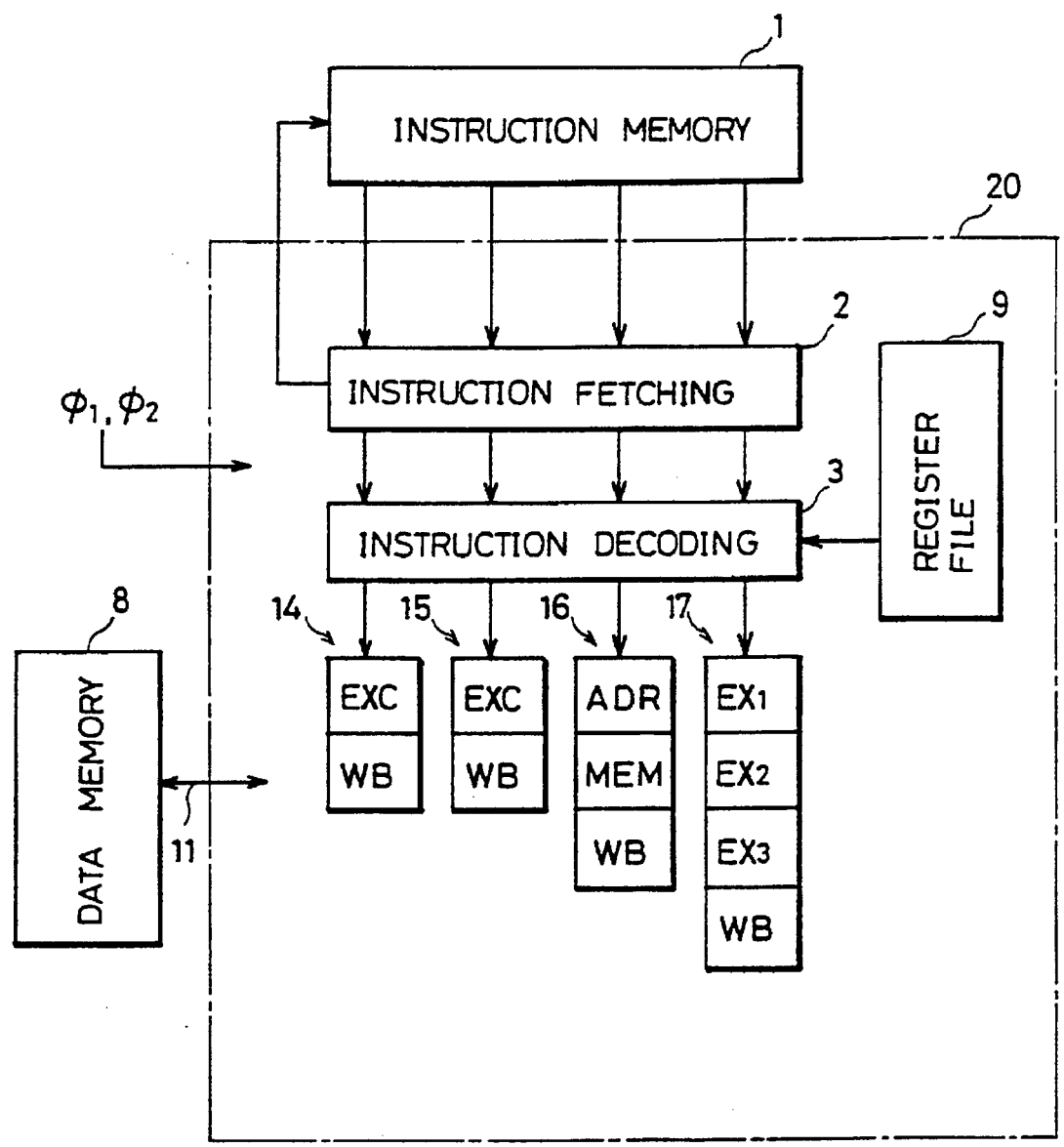
FIG. 7 is a block diagram of a superscalar processor illustrating the background of the present invention.

Referring to FIG. 1, a superscalar processor 10 includes an instruction fetching stage 2, an instruction decoding stage 3, improved function units 4, 5, 6, and 7, register file 9, and a newly provided bypass lines 12. Each of function units 4 to 7 includes an execution stage (EXC) 41, a memory access stage (MEM) 42, and a write back stage (WB) 43. Superscalar processor 10 is operated in response to an externally applied two-phase non-overlap clock signal $\phi 1$, $\phi 2$ under pipeline control. The basic operation is the same as that of the conventional superscalar processor 20 illustrated in FIG. 7, so that description of it will be omitted.

Bypass line 12 is provided between respective function units 4 to 7, and data obtained in the execution stage in the function units is transmitted through bypass line 12. In addition, although not particularly illustrated, the destination addresses included in instructions processed in respective function units are transmitted between function units 4 to 7.

Figure 2:
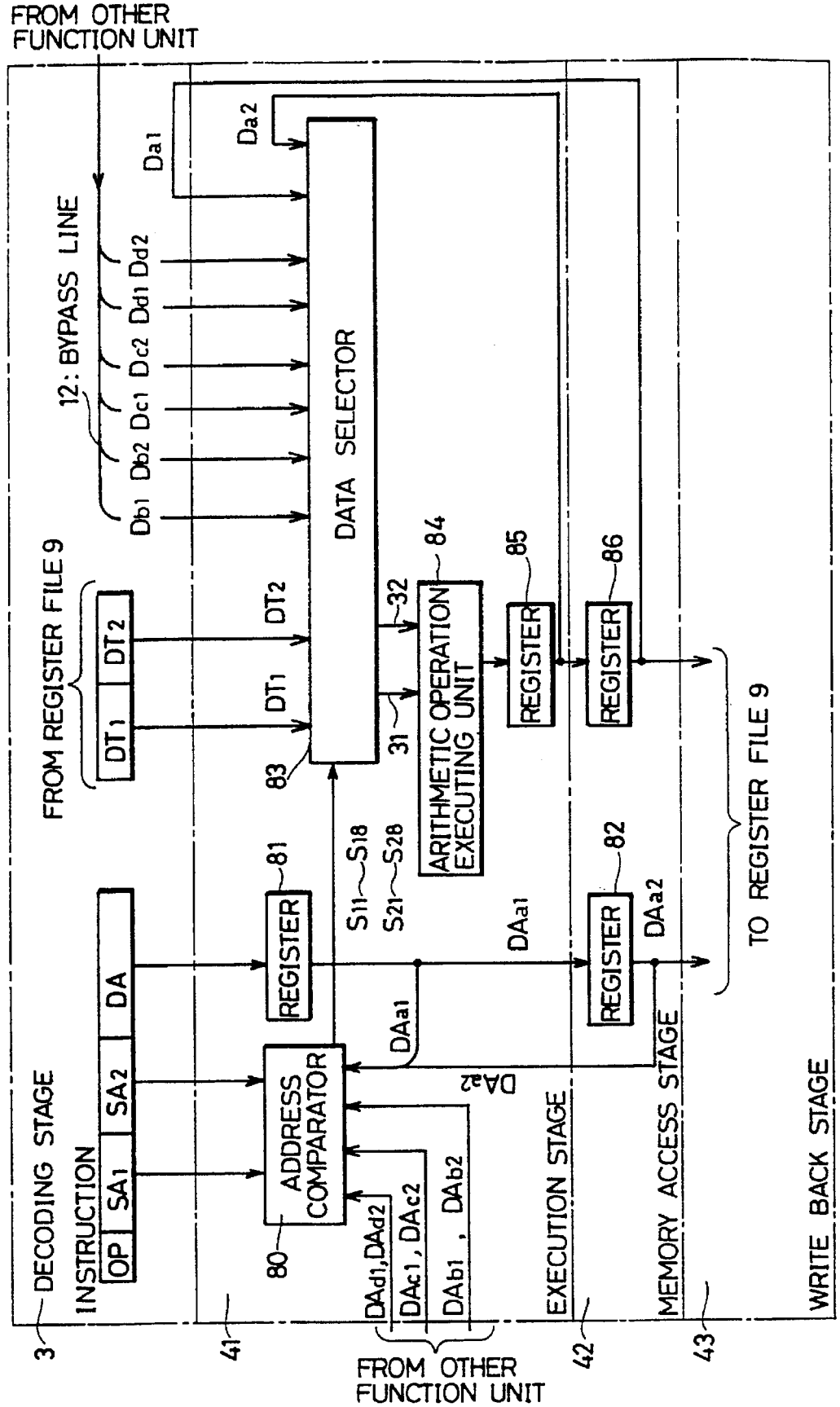
FIG. 2 is a block diagram of one of the function units illustrated in FIG. 1.

One of the improved function units illustrated in FIG. 1 is illustrated in FIG. 2. Referring to FIG. 2, the improved function unit includes an execution stage 41 for executing an instruction, a memory access stage 42 for accessing data memory 8 or register file 9, and a write back stage 43 for writing the data obtained by executing the instruction into register file 9.

Execution stage 41 includes an address comparator 80 for comparing a source address and a destination address, a data selector 83 responsive to signals S11 to S18 and S21 to S28 indicating comparison results for selecting data to be used in an arithmetic operation, and an arithmetic operation executing unit 84 for executing the arithmetic operation on the basis of the selected data. An instruction given from decoding stage 3 includes an instruction code OP, two source addresses SA1 and SA2, and a destination address DA. Address comparator 80 receives the source addresses SA1 and SA2 included in the given instruction. In addition, address comparator 80 receives destination addresses DAb1, DAb2, DAc1, DAc2, DAd1, and DAd2 included in instructions handled in the other function units 5, 6, and 7 illustrated in FIG. 1. Furthermore, address comparator 80 receives a destination address DAa1 in execution stage 41 and a destination address DAa2 in memory access stage 42. Address comparator 80 compares source addresses SA1 and SA2 and destination addresses DAa1 to DAa2 and detects coincidence between them, and the details of this will be described later.

Destination register 81 holds a destination address DA given from decoding stage 3. The held destination address DAa1 is given to address comparator 80 and to destination register 82 in memory access stage 42.

Data selector 83 is connected to receive two data DT1 and DT2 given by register file 9 through decoding stage 3. Data DT1 and DT2 are required by an instruction in execution stage 41. In addition, data selector 83 receives data Db1, Db2, Dc1, Dc2, Dd1, and Dd2 having been executed in the execution stages in the other function units 5, 6, and 7 illustrated in FIG. 1 through newly provided bypass line 12. Furthermore, data selector 83 receives data Da1 held by data register 86 in memory access stage 42 and data Da2 held by data register 85 in execution stage 41. Data selector 83 is operated in response to selection signals S11 to S18 and S21 to S28 given from address comparator 80, and the details of this will be described later.

Arithmetic operation executing unit 84 is connected through data lines 31 and 32 to data selector 83. Data selected by data selector 83 is applied through data lines 31 and 32 to arithmetic operation executing unit 84, and an arithmetic operation based on the given instruction is execute there. Data indicating the execution result of the arithmetic operation is held by data register 85.

Memory access stage 42 includes a destination register 82 for holding a destination address and a data register 86 for holding data indicating an arithmetic operation result. Write back stage receives the destination address held by destination register 82 and the executed data held by data register 86. Write back stage 43 writes the executed data into register file 9 in accordance with the given destination address.

Figure 3:
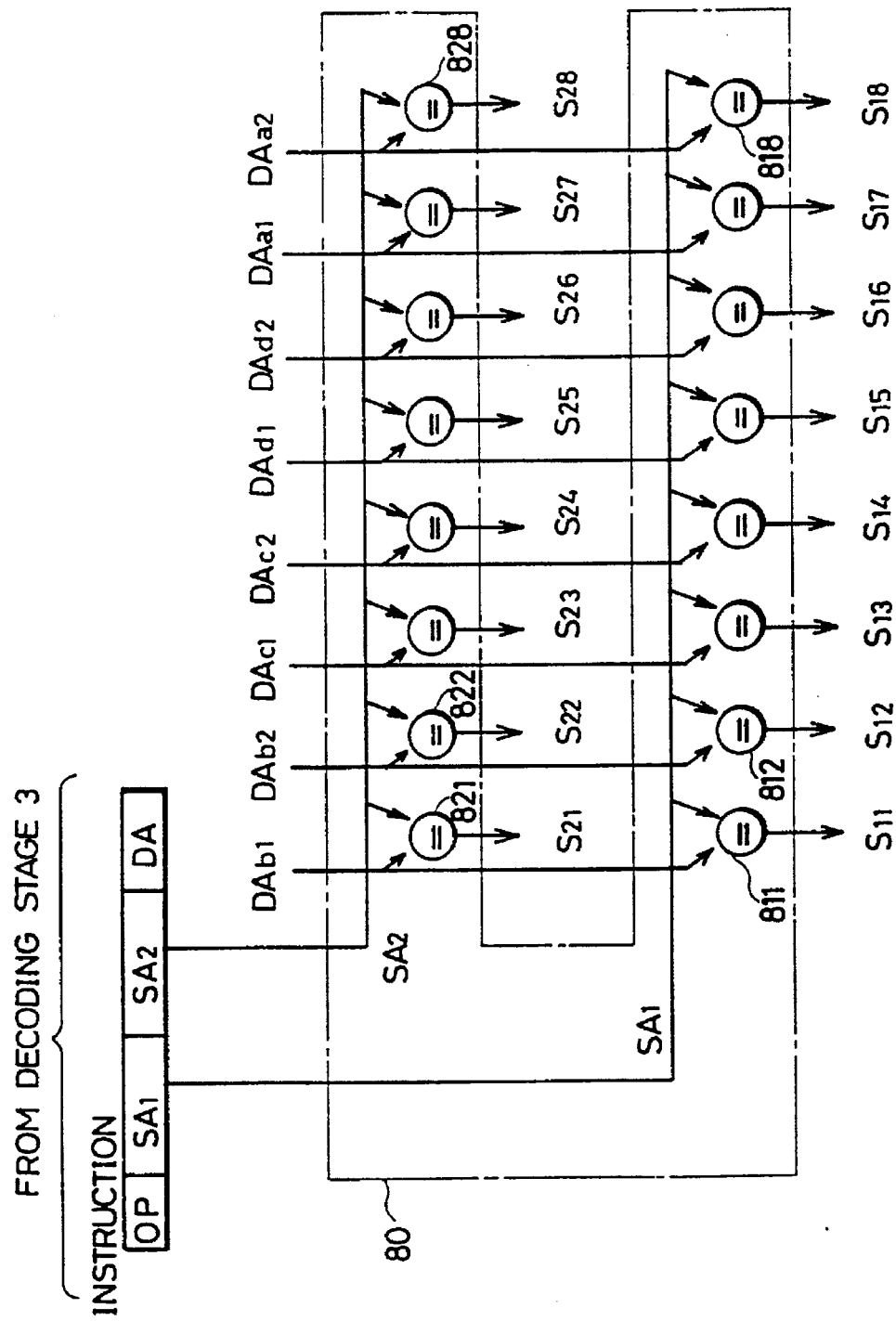
FIG. 3 is a block diagram of the address comparator illustrated in FIG. 2.

An example of the address comparator illustrated in FIG. 2 is illustrated in FIG. 3. Referring to FIG. 3, an address comparator 80 includes coincidence detectors 811 to 818 for detecting coincidence between a source address SA1 and a destination address and coincidence detectors 821 to 828 for detecting coincidence between a source address SA2 and a destination address. Source addresses SA1 and SA2 are included in an instruction given from a decoding stage 3. Coincidence detectors 811 to 818 receive destination addresses DAb1, DAb2, DAc1, DAc2, DAd1, and DAd2 given from the other function units and its own destination addresses DAa1 and DAa2, respectively. Coincidence detectors 821 to 828 receive destination addresses in the same way. A coincidence detector, for example, detector 811 detects coincidence between the given source address SA1 and destination address DAb1 and generates coincidence detecting signal S11 at a high level. Coincidence detecting signals S11 to S18 and S21 to S28 are given as selection signals for selecting data used in an arithmetic operation to data selector 83.

Figure 4:
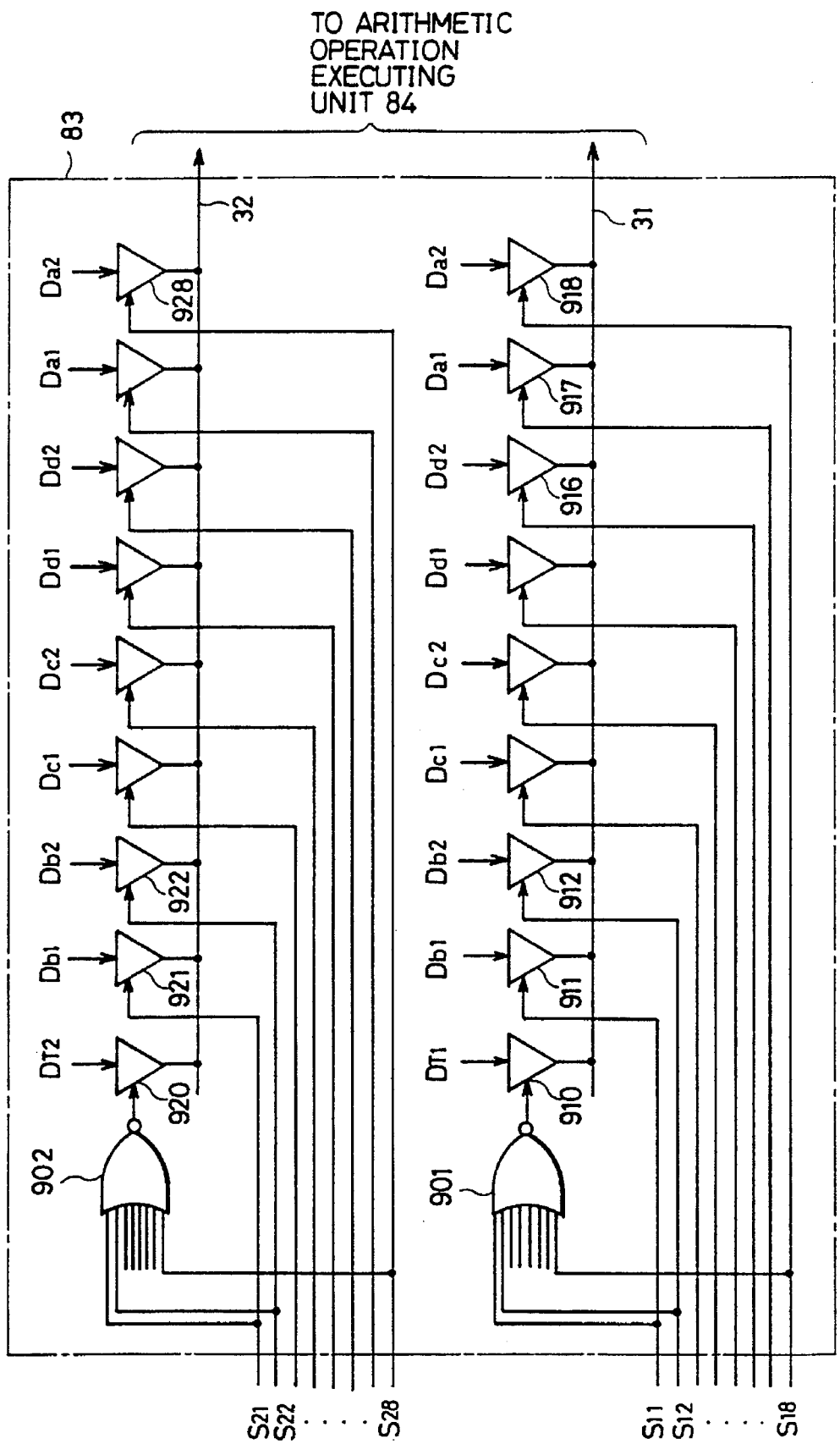
FIG. 4 is a block diagram of the data selector illustrated in FIG. 2.

An example of data selector 83 is illustrated in FIG. 4. Referring to FIG. 4, data selector 83 includes tri-state buffers 910 to 918 connected to a data line 31, tri-state buffers 920 to 928 connected to a data line 32, and two NOR gates 901 and 902. Tri-state buffers 910 and 920 are connected to receive data DT1 and DT2 given from register file 9, respectively. Tri-state buffers 911 to 916 receive data Db1, Db2, Dc1, Dc2, Dd1, and Dd2 applied from the other function units 5, 6 and 7 through a bypass line 12, respectively. Tri-state buffers 917 and 918 receive their own executed data Da1 and Da2, respectively. Tri-state buffers 921 to 928 receive the given data in the same way as tri-state buffers 911 to 918. Tri-state buffers 911 to 918 are controlled in response to data selection signals S11 to S18 given from address comparator 80, respectively. For example, when data selection signal S11 at a high level is applied, tri-state buffer 911 applies data Db1 on bypass line 12 to data line 31. On the other hand, tri-state buffer 910 operates in response to an output signal from a NOR gate 901. If all data selection signals S11 to S18 indicate a low level, NOR gate 901 applies an output signal at a high level to tri-state buffer 910, so that data DT1 given from register file 9 is applied to data line 31.

Tri-state buffers 921 to 928 operate in response to data selection signals S21 to S28, respectively. Tri-state buffer 920 operates in response to an output signal from a NOR gate 902. Data selected by transmission gates 910 to 918 and 920 to 928 is applied through data lines 31 and 32 to arithmetic operation executing unit 84.

Figure 5:
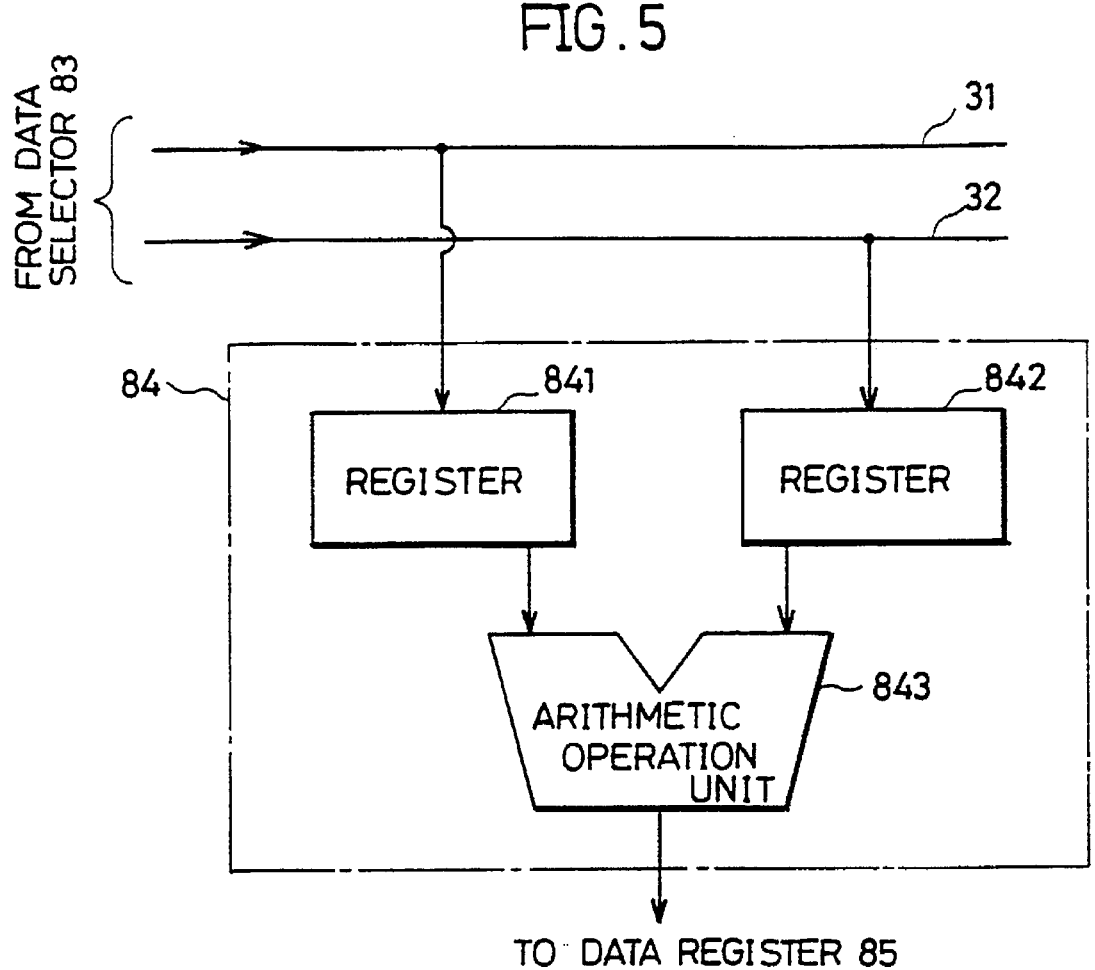
FIG. 5 is a block diagram of the arithmetic operation executing unit illustrated in FIG. 2.
Figure 6:
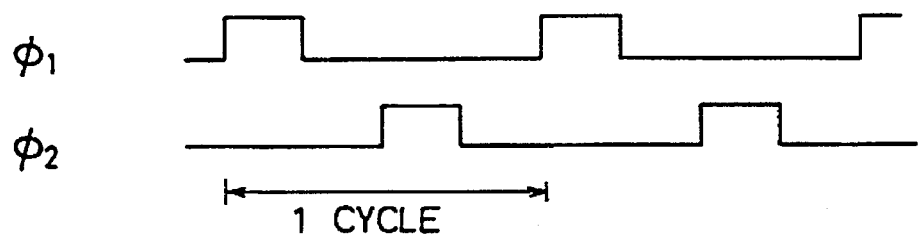
FIG. 6 is a timing chart of a two-phase non-overlap clock signal.

An example of arithmetic operation executing unit 84 is illustrated in FIG. 5. Referring to FIG. 5, arithmetic operation executing unit 84 includes registers 841 and 842 for holding data applied through data lines 31 and 32, respectively, and an arithmetic operation unit (ALU) 843 for performing an arithmetic operation using the data held by registers 841 and 842. The data obtained by performing the arithmetic operation in arithmetic operation unit 843 is applied to data register 85 illustrated in FIG. 2.

Figure 8A:
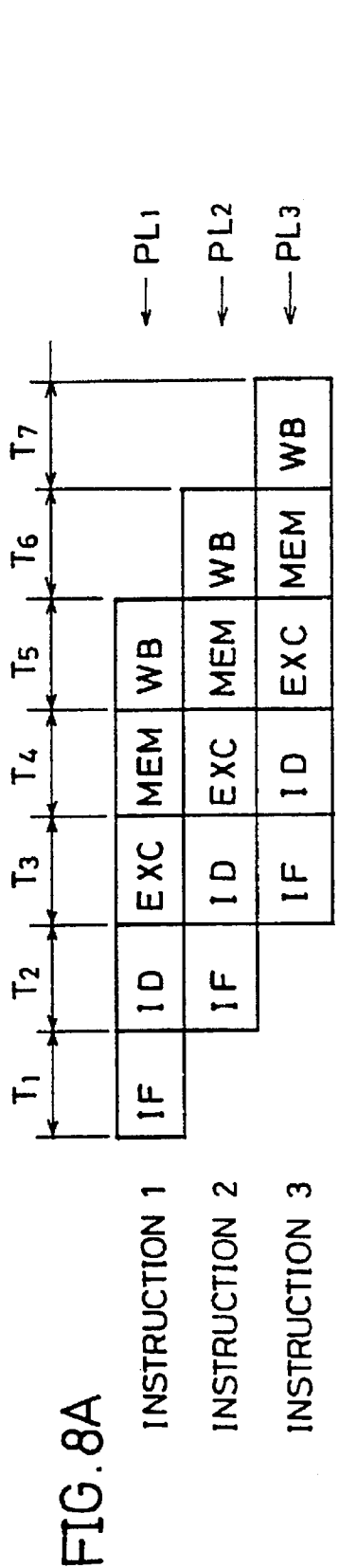
FIGS. 8A, 8B, and 8C are timing charts illustrating progress of pipeline processing.
Figure 8B:
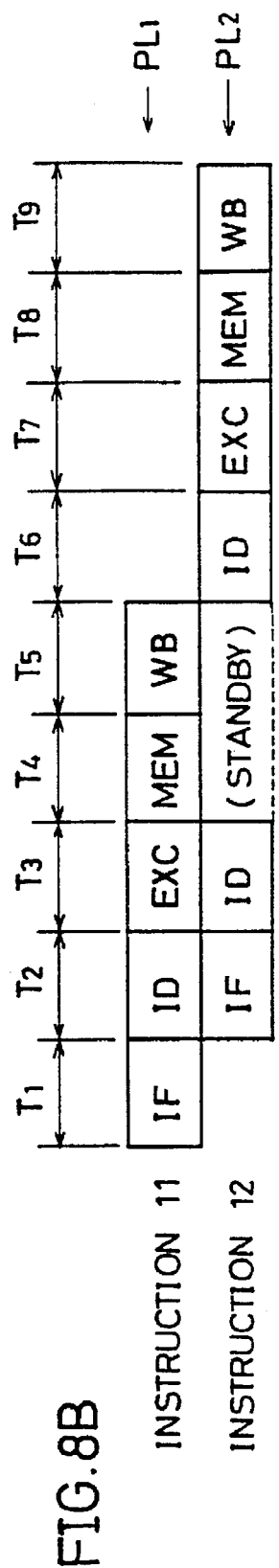
Figure 8C:
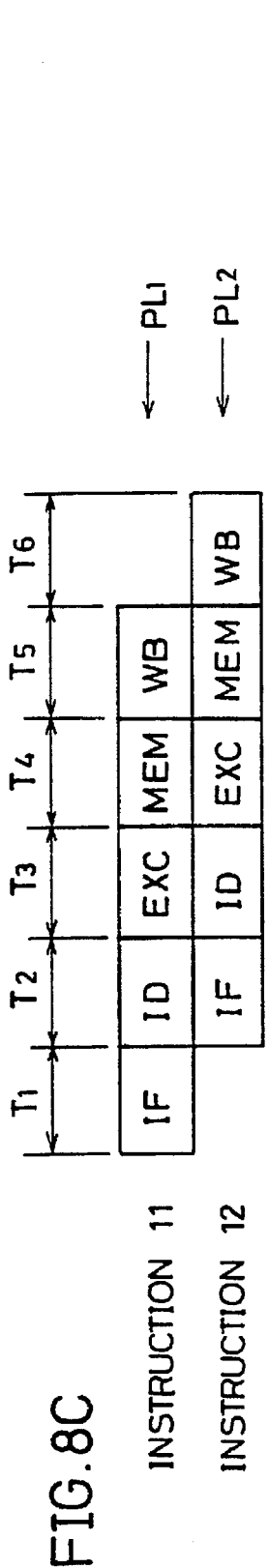

Now, referring to FIGS. 1 to 5 and FIG. 8C, operation of superscalar processor 10 illustrated in FIG. 1 will be described. It is assumed that superscalar processor_10 illustrated in FIG. 1 also executes instructions 11 and 12 described above with reference to FIG. 8B in the following description. Referring to FIG. 8C, instruction fetching stage 2 executes instruction 11 in period T1 (pipeline PL1). In period T2, instruction decoding stage 3 executes instruction 11 (pipeline PL1), and, on the other hand, instruction fetching stage 2 executes instruction 12. In period T3, instruction 11 is executed in pipeline PL1, and the executed data is obtained. The executed data is scheduled to be written into register file 9 in accordance with the destination address included in instruction However, the executed data is scheduled to be used in the execution stage in pipeline PL2 in instruction 12, so that the executed data is applied through bypass line 12 illustrated in FIG. 1 to pipeline PL2 as described in the following. In the above description, pipeline PL1 corresponds to function unit 5, and pipeline PL2 corresponds to function unit 4.

Function unit 4 constituting pipeline PL2 has the structure illustrated in FIG. 2. Referring to FIG. 2, address comparator 80 compares source addresses SA1 and SA2 included in the given instruction 12 and destination addresses DAa1, DAa2, . . . DAd1, and DAd2. Referring to FIG. 3 again, when coincidence is detected, coincidence detection signals S11 to S18 or S21 to S28 at a high level are generated as selection signals.

Data selector 83 illustrated in FIG. 4 selectively applies data given through bypass line 12 to data lines 31 and 32 in response to data selection signals S11 to S18 and S21 to S28. If all the data selection signals S11 to S18 and S21 to S28 are at a low level, in the other words, if no coincidence between the source addresses and the destination addresses is detected, data DT1 and DT2 given from register file 9 are applied to data lines 31 and 32. Accordingly, when at least one coincidence is detected in address comparator 80 illustrated in FIG. 3, data in other function unit (i.e. pipeline PL1) is transmitted through bypass line 12 (i.e. not through register file 9) to function unit 4 (i.e. pipeline PL2). The data executed in the other pipeline PL1 is applied not through register file 9 to pipeline PL2, so that it becomes unnecessary for pipeline PL2 to wait for termination of execution in the memory access stage and the write back stage in pipeline PL1.

Specifically, referring to FIG. 8C again, executed data obtained in the execution stage in pipeline PL1 in period T3 is applied through bypass line 12 to pipeline PL2, so that the execution stage in pipeline PL2 can operate in period T4. While execution of processing in pipeline PL2 was made to stand by in periods T4 and T5 (pipeline interlock) as illustrated in FIG. 8B in the conventional superscalar processor 20 illustrated in FIG. 7, it is possible to continue execution of processing in the execution stage and the memory access stage in periods T4 and T5 in superscalar processor 10 illustrated in FIG. 1. In the other words, pipeline interlock does not occur. The reason for this is that the data executed in pipeline PL1 is applied through bypass line 12 to pipeline PL2, so that it becomes unnecessary to wait for termination of execution in the memory access stage and the write back stage in pipeline PL1.

As a result, as seem from comparison between FIGS. 8B and 8C, the period (T2 to T6) required for pipeline PL2 to complete execution of instruction 12 is made shorter than the period (T2 to T9) required in the conventional superscalar processor. Accordingly, processing at a higher speed in a superscalar processor is achieved.

While superscalar processor 10 each having the same pipeline structures (i.e. stages) has been described in the example illustrated in FIG. 1, it is pointed out that application of the present invention is not limited to that. Specifically, even if the superscalar processors have different pipeline structures, it is possible to obtain the above-described advantages with respect to the time required for processing by providing a bypass line between pipelines.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A superscalar processor including means for storing data and executing a first plurality of instructions given earlier and a second plurality of instructions given later under pipeline control using data stored in said data storage means, wherein each of said instructions includes a source address indicating an address in said data storage means in which data to be used for executing the instruction is stored and a destination address indicating an address in said data storage means in which the executed data should be stored, said superscalar processor comprising:

simultaneously executable instruction detecting means for detecting simultaneously executable instructions out of said given first and second plurality of instructions; and a plurality of pipeline processing executing means for executing respective instructions detected by said simultaneously executable instruction detecting means in parallel and simultaneously under pipeline control, each of said plurality of pipeline processing executing means including an instruction executing means for executing sequentially the given instructions under pipeline control and including address coincidence detecting means for detecting coincidence between the source address included in the given instruction and the destination address included in an instruction executed earlier by an instruction executing means in the same pipeline processing executing means or another pipeline processing executing means, and direct application means responsive to said address coincidence detecting means for directly applying the data executed earlier by an instruction executing means in one pipeline processing executing means to the instruction executing means provided in at least one other pipeline processing executing means.

2. The superscalar processor according to claim 1, wherein said simultaneously executable instruction detecting means includes decoding means for decoding said first and second plurality of instructions to detect said simultaneously executable instructions.

3. The superscalar processor according to claim 1, wherein said direct application means includes a data transmission line connected between each of said plurality of pipeline processing executing means for transmitting the data executed earlier by an instruction executing means to the instruction executing means provided in said at least one other pipeline processing executing means, and data selecting means for receiving data transmitted through said data transmission line and selecting the transmitted data in response to said address coincidence detecting means.

4. The superscalar processor according to claim 1, wherein each instruction executing means includes a memory access state for executing memory access in accordance with the given instruction, and an execution state for executing an arithmetic operation in accordance with the give instruction.

5. The superscalar processor according to claim 1, wherein said data storage means includes a register file for storing temporarily the data to be used in said first or second plurality of instructions.

* * * * *